(12) United States Patent
Chai et al.

(10) Patent No.: US 7,603,492 B2
(45) Date of Patent: Oct. 13, 2009

(54) AUTOMATIC GENERATION OF STREAMING DATA INTERFACE CIRCUIT

(75) Inventors: Sek M. Chai, Streamwood, IL (US); Nikos Bellas, Chicago, IL (US); Malcolm R. Dwyer, Glendale Heights, IL (US); Erica M. Lau, Schaumburg, IL (US); Zhiyuan Li, Lake Zurich, IL (US); Daniel A. Linzmeier, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 355 days.

(21) Appl. No.: 11/231,171

(22) Filed: Sep. 20, 2005

(65) Prior Publication Data

US 2007/0067508 A1 Mar. 22, 2007

(51) Int. Cl.
*G06F 13/00* (2006.01)
*G06F 13/12* (2006.01)
*G06F 15/00* (2006.01)

(52) U.S. Cl. ............................... 710/33; 710/8; 710/62; 710/72; 712/2; 712/7; 712/9

(58) Field of Classification Search .................... 712/2, 712/7, 9; 710/8, 33, 62, 72
See application file for complete search history.

(56) References Cited

U.S. PATENT DOCUMENTS

| | | | |
|---|---|---|---|
| 5,535,319 A | 7/1996 | Pascoe et al. | 715/235 |
| 5,694,568 A * | 12/1997 | Harrison et al. | 711/213 |
| 5,699,277 A | 12/1997 | Munson et al. | 715/725 |
| 5,854,929 A | 12/1998 | Van Praet et al. | 717/156 |
| 5,856,975 A | 1/1999 | Rostoker et al. | 370/395.64 |
| 6,023,579 A * | 2/2000 | Hellgren et al. | 717/108 |
| 6,172,990 B1 | 1/2001 | Deb et al. | 370/474 |
| 6,195,024 B1 | 2/2001 | Fallon | 341/51 |
| 6,195,368 B1 | 2/2001 | Gratacap | 370/535 |
| 6,295,586 B1 | 9/2001 | Novak et al. | 711/154 |
| 6,408,428 B1 | 6/2002 | Schlansker et al. | 716/17 |
| 6,549,991 B1 | 4/2003 | Huang et al. | 711/158 |
| 6,591,349 B1 | 7/2003 | Steinman et al. | 711/154 |

(Continued)

FOREIGN PATENT DOCUMENTS

WO WO 2004-055667 A2 7/2004

OTHER PUBLICATIONS

"The Reconfigurable Streaming Vector Processor (RSVP)" by Ciricescu et al., Proceedings of the 36th International Symposium on Microarchitecture, 2003.*

(Continued)

*Primary Examiner*—Henry W. H. Tsai
*Assistant Examiner*—Steven G Snyder

(57) ABSTRACT

A streaming data interface device (700) of a streaming processing system (200) is automatically generated by selecting a set of circuit parameters (610) consistent with a set of circuit constraints and generating (612, 614) a representation of a candidate memory interface device based upon a set of stream descriptors. The candidate streaming data interface device is evaluated (616) with respect to one or more quality metrics and the representation of the candidate streaming processor circuit is output (622) if the candidate memory interface device satisfies a set of processing system constraints and is better in at least one of the one or more quality metrics than other candidate memory interface devices.

20 Claims, 6 Drawing Sheets

U.S. PATENT DOCUMENTS

| | | | |
|---|---|---|---|
| 6,647,456 B1 | 11/2003 | Van Dyke et al. | 711/105 |
| 6,701,515 B1 | 3/2004 | Wilson et al. | 717/117 |
| 6,721,884 B1 | 4/2004 | De Oliveira Kastrup Pereira et al. | 713/2 |
| 6,744,274 B1* | 6/2004 | Arnold et al. | 326/16 |
| 6,778,188 B2 | 8/2004 | Emberling et al. | 345/606 |
| 6,813,701 B1 | 11/2004 | Ansari | 712/4 |
| 6,825,848 B1 | 11/2004 | Fu et al. | 345/557 |
| 6,892,286 B2 | 5/2005 | Hangal et al. | 711/154 |
| 6,925,507 B1 | 8/2005 | Hersent | 710/52 |
| 6,941,548 B2 | 9/2005 | Goodwin et al. | 717/151 |
| 6,958,040 B2 | 10/2005 | Oliver et al. | 600/439 |
| 7,054,989 B2 | 5/2006 | Mizobata | 710/316 |
| 7,075,541 B2 | 7/2006 | Diard | 345/505 |
| 7,159,099 B2* | 1/2007 | Lucas et al. | 712/218 |
| 7,246,203 B2* | 7/2007 | Moat et al. | 711/133 |
| 7,305,649 B2 | 12/2007 | Bellas et al. | 716/17 |
| 7,392,498 B1* | 6/2008 | Srinivasan et al. | 716/16 |
| 7,426,709 B1* | 9/2008 | Ganesan | 716/16 |
| 2002/0046251 A1 | 4/2002 | Siegel | 709/213 |
| 2002/0133784 A1 | 9/2002 | Gupta et al. | 716/1 |
| 2002/0151992 A1 | 10/2002 | Hoffberg et al. | 700/83 |
| 2004/0003206 A1* | 1/2004 | May et al. | 712/218 |
| 2004/0003220 A1 | 1/2004 | May et al. | 712/245 |
| 2004/0003376 A1 | 1/2004 | May et al. | 717/132 |
| 2004/0117595 A1 | 6/2004 | Norris et al. | 711/214 |
| 2004/0128473 A1 | 7/2004 | May et al. | 712/7 |
| 2004/0153813 A1 | 8/2004 | Swoboda | 714/36 |
| 2005/0050252 A1 | 3/2005 | Kuno | 710/100 |
| 2005/0071835 A1 | 3/2005 | Essick et al. | 717/161 |
| 2005/0122335 A1 | 6/2005 | MacInnis et al. | 345/520 |
| 2005/0257151 A1 | 11/2005 | Wu | 715/716 |
| 2005/0289621 A1 | 12/2005 | Mungula | 725/100 |
| 2006/0031791 A1 | 2/2006 | Moona et al. | 716/3 |
| 2006/0044389 A1 | 3/2006 | Chai et al. | 348/143 |
| 2006/0067592 A1* | 3/2006 | Walmsley et al. | 382/303 |
| 2006/0242617 A1 | 10/2006 | Bellas et al. | 716/18 |
| 2006/0265485 A1 | 11/2006 | Chai et al. | 709/223 |
| 2008/0120497 A1 | 5/2008 | Chai et al. | 713/1 |

OTHER PUBLICATIONS

"Interface Design Approach For System On Chip Based On Configuration" by Maalej et al., Proceedings of the 2003 International Symposium on Circuits and Systems, May 2003.*

"Interface Architecture Generation for IP Integration in SoC Design" by Abbes et al., The 2006 International Conference on Computer Engineering and Systems, Nov. 2006.*

"Automatic Generation of Interfaces for C-VHDL Cosimulation of Embedded Systems: An Industrial Experience" by Valderrama et al., Proceedings of the Seventh IEEE International Workshop on Rapid System Prototyping, Jun. 1996.*

Vistnes et al., "Reconfigurable Address Generators for Stream-Based Computation Implemented on FPGAs," Proceedings of the 19th IEEE International Parallel and Distributed Processing Syumposium (IPDPS 2005), 4 pages.

Amarasinghe et al., "Stream Architectures," Architectures, Languages and Comilers for the Streaming Domain, Massachusetts Instititue of Technology, Pact Tutorial, Sep., 2003, pp. 1-49.

Amarasinghe et al., "Stream Compilers," Architectures, Languages and Comilers for the Streaming Domain, Massachusetts Institute of Technology, Pact Tutorial, Sep., 2003, pp. 1-42.

Babb et al., "Parallelizing Applications into Silicon," Proceedings of the 7th Annual IEEE Symposium on Field-Programmable Custom Computing machines, 1999, FCCM '99, Apr. 21-23, 1999, pp. 70-80.

Bhattacharyya et al., "Mapping DSP Applications onto Self-Timed Multiporcessors," Conference Record of the 35th Asilomar Conference on Signals, Systems and Computers, Nov. 2001, vol. 1, pp. 441-448.

Buck, "Static Scheduling and Code Generation from Dynamic Dataflow Graphs With Integer-Valued Control Streams," Conference Record of the 28th Asilomar Conference on Signals, Systems and Computers, Oct. 31 - Nov. 2, 1994, vol. 1, pp. 508-513.

Callahan, "Kernel Formation in Garpcc," 11th Annual IEEE Symposium on Field-Programmable Custom Computing Machines 2003, FCCM '03, Apr. 9-11, 2003, pp. 308-309.

Callahan et al., "The Garp Architecture and C Compiler," Computer, vol. 33, Issue 4, Apr. 2000, pp. 62-69.

Caspi et al., "A Streaming Multithreaded model," 3rd Workshop on Media and Stream Processors (MSP-3) Dec. 2, 2001, 8 pages.

Caspi et al., "Stream Computations Organized for Reconfigurable Execution (Score): Induction and Tutorial," Abstract, U.C. Berkley BRASS Group, Aug. 25, 2000, Version 1.0, pp. 1-31.

Chiricescu et al., "RSVP II: A Next Generation Automotive Vector Processor," Proceedings of the IEEE Intelligent Vehicles Symposium, 2005, Jun. 6-8, 2005, pp. 563-568.

Ebeling et al., "RaPiD - Reconfigurable Pipelined Datapath," The 6th International Workshop on Field-Programmable logic and Applications, 1996.

Erez "Stream Architectures - Efficiency and Programmability," Proceedings of the International Symposium on System-on-Chip, Nov. 16-18, 2004, p. 41.

Erez et al., "Merrimac - Supercomputing with Stream, Extended Abstract for GP2 Poster Session," Stanford University, Stanford CA, 1 page.

Goldstein et al., "PipeRench: a Reconfigurable Architecture and Compiler," Computer, vol. 33, Issue 4, Apr. 2000, pp. 70-77.

Govindarajan et al., "A Novel Framework for Multi-Rate Scheduling in DSP Applications," Proceedings of the International Conference on Application-Specific Array Processors, Oct. 25-27, 1993, pp. 77-88.

Greb et al., "GPU-ABiSort: Optimal Parallel Sorting on Stream Architectures," 20th International Parallel and Distributed Processing Symposium, IPDPS, Apr. 25-29, 2006, 10 pages.

Jayasena et al., "Streams and Vectors: A Memory System Perspective," Abstract, Computer Systems Laboratory, Stanford university, Stanford, CA, pp. 1-10.

Kapasi et al., "Programmable Stream Processors," Computer, vol. 36, Issue 8, Aug. 2003, pp. 54-62.

Kapasi et al, "The Imagine Stream Processor," Proceedings of the IEEE International Conference on Computer Design: VLSI in Computers and Processors, Sep. 16-18, 2002, 282-288.

Kathail et al., "Pico: Automatically Designing Custom Computers," Computers, vol. 35, Issue 9, Sep. 2002, pp. 39-47.

Li et al., "Hardware-Software Co-Design of Embedded Reconfigurable Architectures," Proceedings of the 37th Design Automation Conference 2000, Jun. 5-9, 2000, pp. 507-512.

McKEE et al., "Dynamic Access Ordering for Streamed Computations," IEEE Transactions on Computers, vol. 49, No. 11, Nov. 2000, pp. 1255-1271.

Ranganathan et al., "Reconfigurable Caches and their Applications to Media Processing," IEEE 2000, Proceedings of the 27th International Symposium on Computer Architecture, 2000, pp. 214-224.

Serebrin et al., "A Stream Processor Development Platform," Proceedings of the IEEE International Conference on Computer Design: VLSI in Computers and Processors, Sep. 16-18, 2002, pp. 303-308.

Taylor et al., "Evaluation of the Raw Microprocessor: An Exposed-Wire-Delay Architecture for ILP and Streams," Abstract, CSAIL, Massachusetts Institute of Technology, pp. 1-12.

* cited by examiner

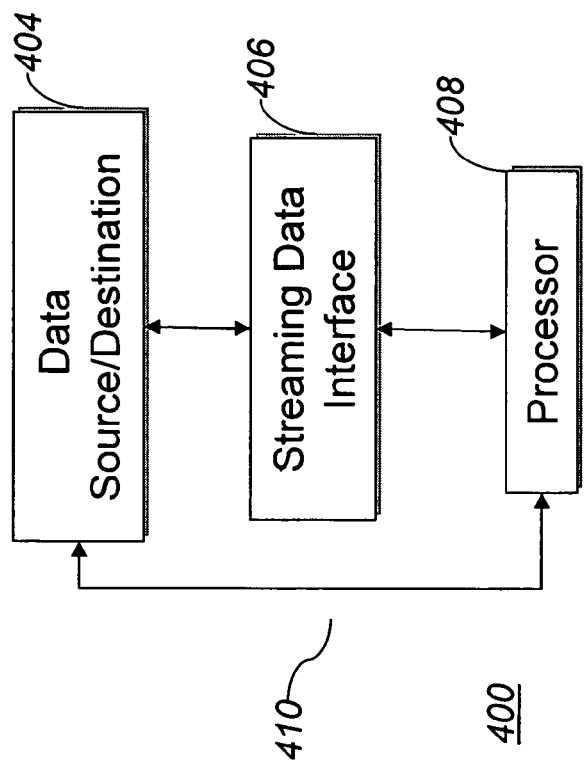
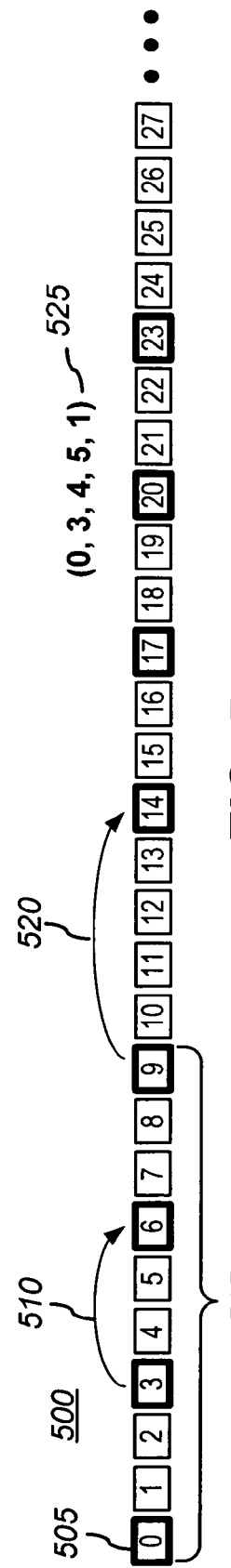
FIG. 4
FIG. 5

AUTOMATIC GENERATION OF STREAMING DATA INTERFACE CIRCUIT

RELATED APPLICATIONS

Application U.S. Ser. No. 11/109,915 filed on Apr. 20, 2005, entitled "Automatic Generation of Streaming Processor Architectures", and Application U.S. Ser. No. 11/131,581 filed on May 18, 2005, entitled "Method And Apparatus For Controlling Data Transfer In A Processing System", both assigned to the assignee hereof, are related to this application.

FIELD OF THE INVENTION

The present invention relates generally to reconfigurable computing, and in particular, to the field of scheduling the fetching of data from memory.

BACKGROUND

Traditionally, integrated circuit processors are designed either as general purpose microprocessors or as application specific integrated circuits (ASIC's). The integrated circuit processors transfer data from memory through a tightly coupled memory interface. A general purpose microprocessor transfers data by following arbitrary sequences of microprocessor instructions defined by a user written program. This provides flexibility but decreases performance because the circuitry is not optimized for any specific application. An ASIC is designed by describing its structure in terms of circuit primitives such as Boolean gates and registers. The circuit designer arranges the circuit primitives so as to optimize performance for a specific application (such as video compression or audio decoding). While an ASIC provides high performance, its fixed architecture cannot be changed after fabrication to adapt to new algorithms or changing standards. Additionally, the high development costs and lengthy design cycle are not suited to rapidly developing markets.

The memory interface for a processing architecture can be advantageously designed for certain applications in which a large amount of ordered data is processed. These architectures are known as streaming architectures, and typically, the ordered data is stored in a regular memory pattern (such as a vector, a two-dimensional shape, or a link list) or transferred in real-time from a peripheral. Processing such ordered data streams is common in media applications, such as digital audio and video, and in data communication applications (such as data compression or decompression). In many applications, relatively little processing of each data item is required, but high computation rates are required because of the large amount of data. Processors and their associated memory interface are conventionally designed with complex circuits that attempt to dynamically predict the data access patterns and pre-fetch required data. This approach is typically limited in performance because data access patterns are difficult to predict correctly for many cases. In addition, the associated circuits consume power and chip area that can otherwise be allocated to actual data processing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present invention.

FIG. 4 is a data flow diagram of a portion of the exemplary processing system described with reference to FIG. 2, in accordance with some embodiments of the present invention;

FIG. 5 is a data stream diagram that shows an example of target data in a data stream, in accordance with some embodiments of the present invention;

Figure 1:
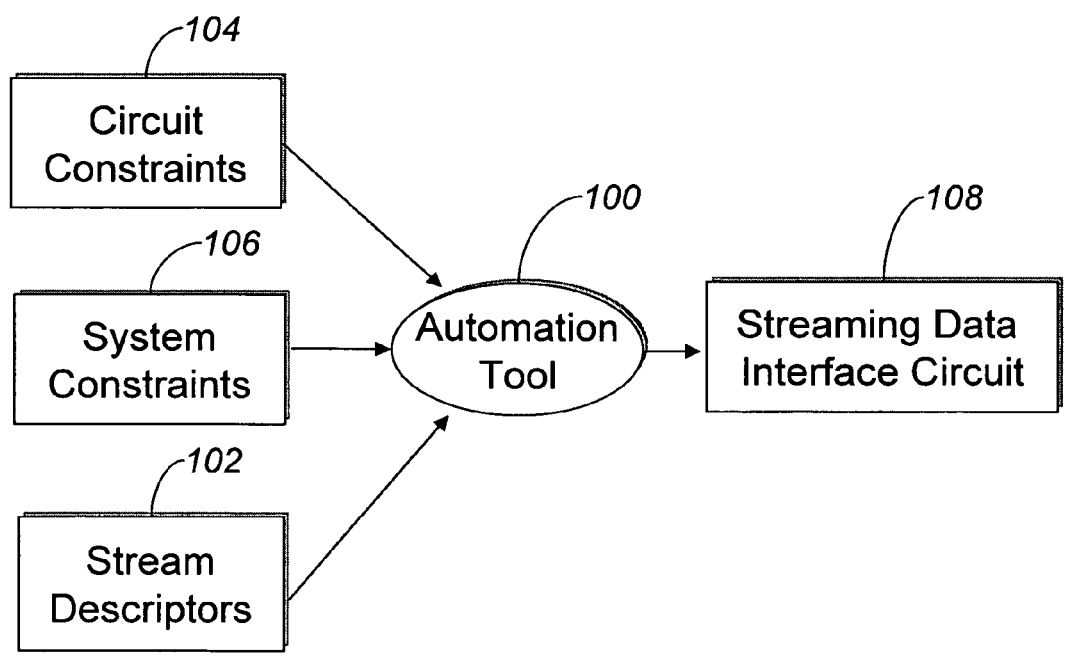
FIG. 1 is a diagram of a system for generating a streaming data interface device in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail embodiments that are in accordance with the present invention, it should be observed that the embodiments reside primarily in combinations of method steps and apparatus components related to processing systems having a streaming architecture. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention relates to the generation of interfaces for devices that transfer data in streaming data processing architectures. In streaming applications, efficient data transfer becomes important because there are large quantities of data items having short lifetimes. Stream processing seeks to either minimize data movement by localizing the computation, or to overlap computation with data movement.

Stream computations are localized into groups or self contained such that there are no data dependencies between other computation groups. Each computation group produces an output stream from one or more input streams. Furthermore, processing performed in each stream computation group is regular or repetitive. There are opportunities for using compiler optimization to increase processing efficiency by organizing the computation and the transfer of data to and from memory using regular access patterns.

When a data item is to be processed, it is typically retrieved by the processor from a memory. This typically requires that the memory address of the data item be calculated. Care needs to be taken to avoid memory address aliasing. Also, when the results of processing are to be written to a memory, the memory address where the result is to be stored typically needs to be calculated. These calculations are dependent upon the ordering of the data in memory.

In accordance with some embodiments of the present invention the calculation of memory addresses is separated from the processing of the data in the hardware of the processor. This may be achieved by using input and output streaming data interface devices. An input streaming data interface device is a circuit that may be programmed to calculate memory addresses for a data stream. In operation an input streaming data interface device (alternatively called an input streaming data interface circuit) retrieves data items from memory or some other device having certain memory characteristics in a specified order and presents them consecutively to the memory or other device, such as a processor, served by the input streaming data circuit. Similarly, an output streaming data interface circuit receives consecutive data items from a memory or other device and stores them in a specified data pattern in a memory or transfers them within a data stream to some other device.

Some embodiments of the present invention may be generally described as ones in which the streaming data interface circuit, consisting of input and output streaming data devices, is determined by an automation tool that takes as inputs circuit parameters that define the system hardware and stream descriptors that define patterns of data within streams of data which are needed for processor operations. The circuit parameters characterize the abilities of the different memory buffers and bus links in memory or other device having memory characteristics, while the stream descriptors define the location and shape of target data in memory storage or in a data stream that is being transferred. Streaming data consists of many target data that may be spread throughout the memory storage in complex arrangements and locations. Using this set of information, the automation tool may generate an optimized streaming data interface that is tightly coupled to a stream processor for a more efficient transfer of required data.

Referring to FIG. 1, a flow diagram shows an example of an automatic configuration of a streaming data interface circuit 108, in accordance with some embodiments of the present invention. An automation tool 100 receives circuit constraints 104, system constraints 106, and a set of input or output stream descriptors 102. The circuit constraints 104 comprise parameters that define hardware limitations of electronic circuits that may be used within the streaming data interface circuit 108, for example, the maximum area, and the maximum number of buffer elements, the maximum circuit latency, and maximum power dissipation of the streaming data interface unit 108. The system constraints 106 comprise parameters that define system and architectural limitations that are external to the streaming data interface circuit 108, such as bus width, bus latency in cycles, bus bandwidth requirements in bytes per cycles, stream processor latency in cycles, and stream processor bandwidth in bytes per cycle.

The stream descriptors 102 define patterns of data within streams of data, wherein the patterns of data comprise a set of data called "target data".

Figure 2:
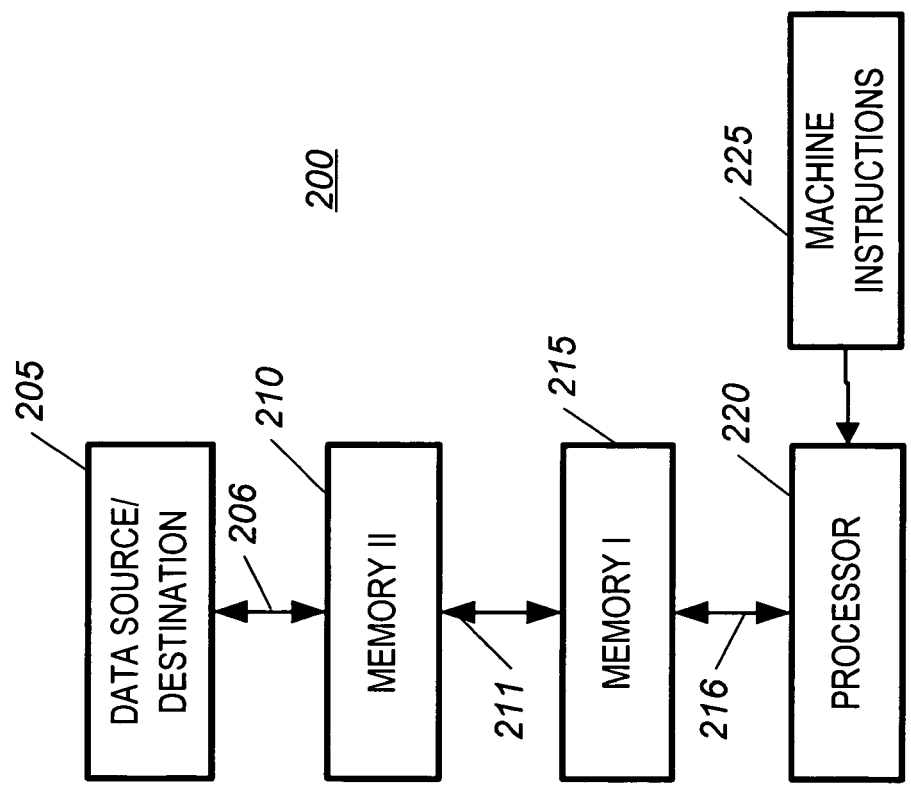
FIG. 2 is a data flow diagram of an exemplary processing system, in accordance with some embodiments of the present invention.

Referring to FIG. 2, a data flow diagram of an exemplary processing system 200 is shown, in accordance with some embodiments of the present invention. The processing system 200 comprises a processor 220 that operates under the control of machine instructions 225. The processor 220 is coupled to a first level memory 215, MEMORY I, a second level memory 210, MEMORY II, and a data source/sink 205. The data source/sink 205 is bi-directionally coupled via data bus 206 to the second level memory 210; the second level memory 210 is bi-directionally coupled via data bus 211 to the first level memory 215; and the first level memory 215 is bi-directionally coupled via data bus 216 to the processor 220. The processor 220 may be a processor that is optimized for the processing of streaming data, or it may be a more conventional processor, such as a scalar processor or DSP that is adapted for streaming data.

Figure 3:
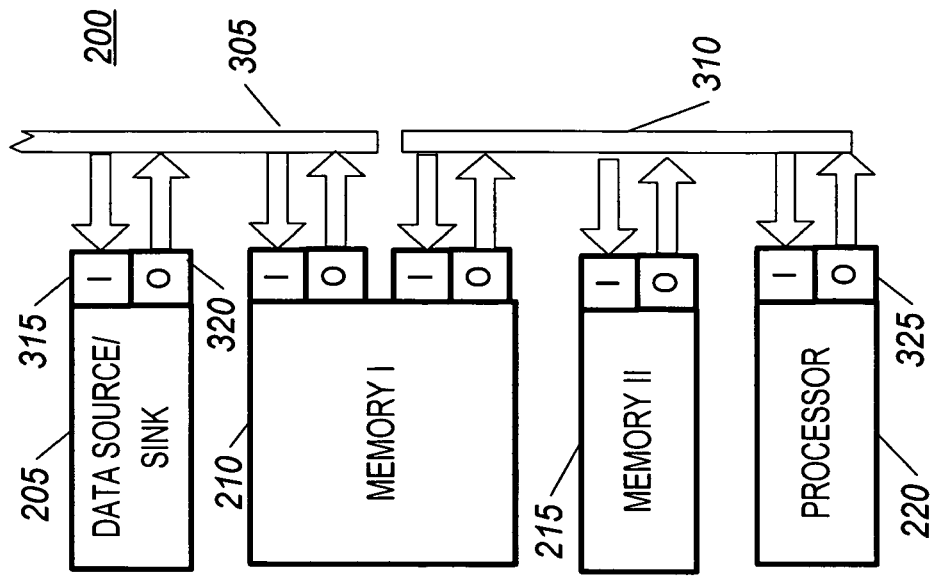
FIG. 3 is an electrical block diagram of the exemplary processing system described with reference to FIG. 2, in accordance with some embodiments of the present invention.

The arrangement of devices shown in FIG. 2 illustrates a wide variety of possible hierarchical arrangements of devices in a processing system, between which data may flow. For the examples described herein, the data that flows may be described as streaming data, which is characterized by including repetitive patterns of information. Examples are series of vectors of known length and video image pixel information. The data source/sink 205 may be, for example, a memory of the type that may be referred to as an external memory, such as a synchronous dynamic random access memory (SDRAM). In these embodiments, the transfer of data between the data source/sink 205 and the processor 220 may be under the primary or sole control of the processor 220. Such an external memory may receive or send data to or from an external device not shown in FIG. 2, such as another processing device or an input device. One example of an external device that may transfer data into a memory 205 is an imaging device that transfers successive sets of pixel information into the memory 205. Another example of an external device that may transfer data into a memory 205 is a general purpose processor that generates sets of vector information, such as speech characteristics. In some embodiments, the data source/sink 205 may be part of a device or subsystem such as a video camera or display. The second level memory 210 may be an intermediate cache memory and the first level memory 215 may be a first level cache memory. In other embodiments, the first level memory 215 may be a set of registers of a central processing device of the processor 220, and the second level memory 210 may be a cache memory. Furthermore, in some embodiments, the first level memory, second level memory, and data source/sink may be included in the same integrated circuit as the processor. It will be appreciated that in some embodiments the second level memory 210 may not exist. Referring to FIG. 3, an electrical block diagram of the exemplary processing system 200 is shown, in accordance with some embodiments of the present invention. As in many processing systems, one or more data buses 305, 310 may be used to electrically couple data in parallel form between the processor 220, the first level memory 215, the second level memory 210, and the data source/sink 205. In the example shown in FIG. 3, the data bus 310 couples the processor 220, the memory II 215, and the memory I 210. The memory I 210 is also coupled to the data source/sink 205 by data bus 305, which may be coupled to other devices not shown in FIG. 3. The data buses 305, 310 may also be used for coupling control information from controlling devices, such as the processor 220. Each of the devices 205, 210, 215, 220 includes input and output interface circuits such as 315, 320, 325, which may be conventional I/O circuits such as buffer registers and drivers that perform impedance and voltage matching functions, but may alternatively be input or output, or both input and output streaming data interface circuits.

In accordance with some embodiments of the present invention, the data that is being transferred from the data source/sink 205 to the object processor 220, or from the object processor 220 to the data source/sink 205, is transferred as streaming data. For this example, a first set of target data is needed for use by an operation to be performed within the processor 220 under control of the machine instructions 225. The set of target data is included at known locations within a larger set of data that comprises a first data stream that is transferred on data bus 305 between data source/sink 205 and second level memory 210. The first data stream may, for example, comprise values for all elements of each vector of a set of vectors, from which only certain elements of each vector are needed for a calculation.

In a specific example, the first data stream is transferred over data bus 305 to memory I 210 for ultimate delivery to processor 220 through memory II 215. The first data stream comprises element values for 20 vectors, each vector having 8 elements, wherein each element is one byte in length, and the target data set comprises only four elements of each of the 20 vectors. It will be appreciated that one method of transferring the set of target data to the object processor 220 would be to transfer all the elements of the 20 vectors over data buses 305, 310. However, this method may not be the most efficient method. When the data buses 305, 310 are each 32 bytes wide, then by appropriate memory addressing of the first level memory 210, a second data stream may be formed by accessing only the four elements of each vector and forming a second data stream for transfer over buses 305, 310 that comprises essentially only the elements of the set of target data, sent in three groups of four elements from each of eight vectors, each group comprising 32 bytes, with the last group filled out with sixteen null bytes. In this example, the optimized data streams that are transferred over buses 305, 310 are identical, but it will be further appreciated that different system constraints 106 related to each data stream transfer may be such that more efficiency may be achieved by using different data stream patterns for each of the data stream transfers over the data buses 305, 310. For this example, when the bus width for bus 310 is sixteen bytes, using five transfers each comprising four elements from four of the 20 vectors may be more efficient.

Referring to FIG. 4, a data flow diagram of a portion 400 of the exemplary processing system 200 is shown, in accordance with some embodiments of the present invention. This diagram illustrates two modes of data interface between a device such as a processor 408 (which could be processor 220) to a data source destination 404 (which could be the data source/destination 205, memory II 210, or memory I 215). Streaming data is coupled between the processor 408 and the data source/destination 404 through a streaming data interface device 406, while other non-streaming data, such as scalar values, control data, and the type of data transferred in a cache access, is coupled using standard data transfer techniques and electronics, as indicated by path 410.

Referring to FIG. 5, a data stream diagram shows an example of target data in a data stream 500, in accordance with some embodiments of the present invention. When the location of the target data in a data stream fits a pattern, the pattern may typically be specified by using data stream descriptors. Stream descriptors may be any set of values that serve to describe patterned locations of the target data within a data stream. One set of such stream descriptors consists of the following: starting address (SA), stride, span, skip, and type. These parameters may have different meanings for different embodiments. Their meaning for the embodiments described herein is as follows. The type descriptor identifies how many bytes are in a data element of the target data, wherein a data element is the smallest number of consecutive bits that represent a value that will be operated upon by the processor 220. For example, in a pixel image comprising pixels that represent 256 colors, a data element would typically be 8 bits (type=1), but a pixel representing one of approximately sixteen million colors may be 24 bits (type=3). For speech vectors, each element of a speech vector may be, for example, 8 bits. In FIG. 5 and for the example embodiments described below, the type identifies how many 8 bit bytes are in an element. Thus, in FIG. 5, the type is 1. In FIG. 5, each element of the data stream is identified by a sequential position number. When the data stream is stored in a memory, these positions would be memory addresses. Data streams described by the descriptors of this example and following examples may be characterized by a quantity (span 515) of target data elements that are separated from each other by a first quantity (stride 510) of addresses. From the end of a first span of target data elements to the beginning of a second span of target data elements, there may be a second quantity of addresses that is different than the stride 510. This quantity is called the skip 520. Finally, a starting position may be identified. This is called the starting address 505 (SA). For the example of FIG. 5, the values of the stream descriptors 525 (SA 505, stride 510, span 515, skip 520, type), also 102 in reference to FIG. 1, are (0, 3, 4, 5, 1). In this example, the target data elements may be, for example, the $0^{th}$, $3^{rd}$, $6^{th}$, and $9^{th}$ elements of a set of vectors, each vector having 14 elements. It will be appreciated that a set of stream descriptors may also include a field that defines the number of target data elements in the data stream. It will be further appreciated that the target data are provided to the destination as contiguous usable data without gaps even though the target data is stored at scattered locations in memory. In contrast, a memory controller, dynamic memory access (DMA) controller and caches would provide interleaved target data and unused data. The target data, being contiguous streams of data, provided by the streaming data interface device would avoid time-gaps in the processing of the same target data.

Figure 6:
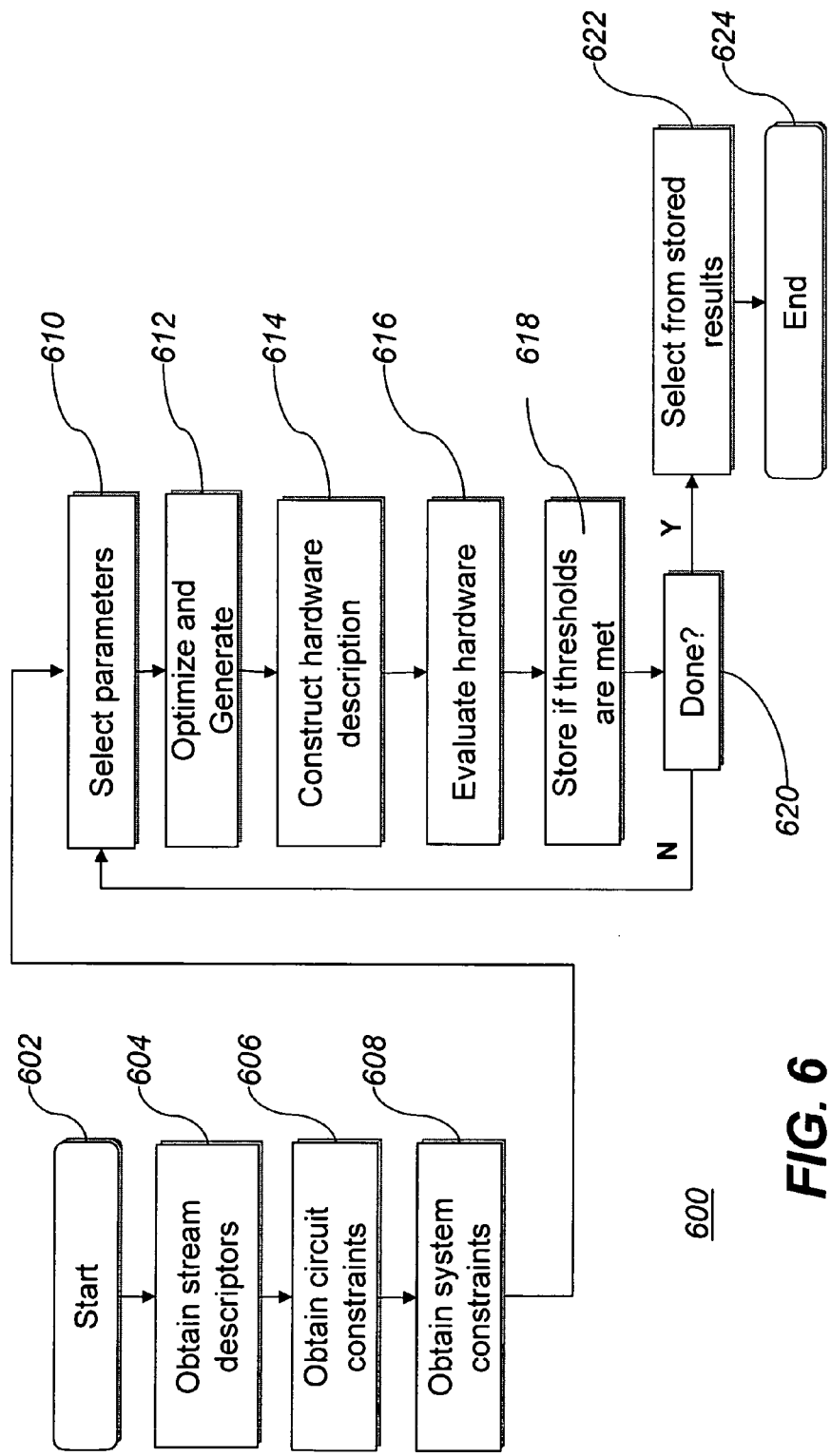
FIG. 6 is a flow chart of a method in accordance with some embodiments of the present invention.

Referring to FIG. 6, a flow chart shows some steps of a method for automatic generation of a stream unit of a streaming data interface device, in accordance with some embodiments of the present invention. The method starts at step 602. At step 604, the automation tool 100 (FIG. 1) obtains a set of stream descriptors 525, such as those describing a video data stream that comprises plurality of sequential vectors that are to be processed using the same algorithm. At step 606, the automation tool 100 (FIG. 1) obtains a set of circuit constraints 104, as described above with reference to FIG. 1. At step 608, the automation tool 100 (FIG. 1) obtains a set of system constraints 106, as described above with reference to FIG. 1. The automation tool starts an iterative optimization process that includes steps 610-620. In this process, each iteration instantiates a set of variables (circuit parameters) in a search space, and attempts to optimize for the remaining variables. At step 610, a set of circuit parameters are selected from a list of circuit constraints 104 by the automation tool 100. These circuit parameters may include the maximum area or the number of buffers, for example. At step 612, the stream descriptors are used to determine the remaining circuit parameters. For example, when the stream descriptor "type" indicates bytes (type=1), then a number of logic gates consuming less than the maximum area to address the data, or a number of buffers to store the data, are determined at step 612, in units of bytes. At step 614, a hardware description of a candidate streaming data interface circuit is generated, using a register transfer language description or other hardware description language. At step 616, the candidate streaming data interface circuit of a current iteration is evaluated using one or more quality metrics, such as area of the candidate circuit, the bandwidth throughput of the candidate circuit, the clock speed of the candidate circuit, and/or the latency of the candidate circuit. If the candidate circuit of the current iteration meets a defined threshold or set of thresholds, such as being pareto-optimal relative to the candidate circuit in all previous iterations, for parameters such as bus latency and bandwidth, a hardware description of the candidate circuit is stored at step 618. The candidate circuit of a current iteration may be a pareto-optimal circuit; that is, the current candidate circuit is better than all previous candidate circuits evaluated in previous iterations in at least one quality metric. At decision step 620, a check is made to determine if the design process is completed. The process may be completed when a specified number of iterations of the candidate circuit have been evaluated during the iterative optimization process, or when a desired quality metric is achieved, or when all combinations of circuit parameters have been evaluated. If the design process is not completed, as indicated by the negative branch from decision step 620, flow returns to step 610 and a new set of circuit parameters are selected. If the design process is completed, as indicated by the positive branch from decision step 620, a circuit is selected from the set of pareto-optimal candidate circuits stored at step 618 and the description is presented at step 622 for designer review. The circuit is selected at step 622 based on a ranking of quality metrics that the designer chooses. For example, if the designer chooses area as the most important metric, the selected circuit is the pareto-optimal circuit for area. Other candidate circuits stored at step 618 are pareto-optimal circuits for different quality metric, such as latency, throughput, and clock speed. In an alternative embodiment, the selected circuit is presented to other processes such as a chip synthesis tool, not shown in FIG. 6, wherein the streaming data interface circuit can be implemented in an ASIC or configurable logic such as a field programmable gate array (FPGA). At step 622, the selected circuit is a configured stream unit that can be integrated into a streaming data interface device. The process terminates at step 624. By using this method repetitively with different sets of stream descriptors 102, circuit constraints 104, and system constraints 106, an automated design of a streaming interface device is accomplished.

Figure 7:
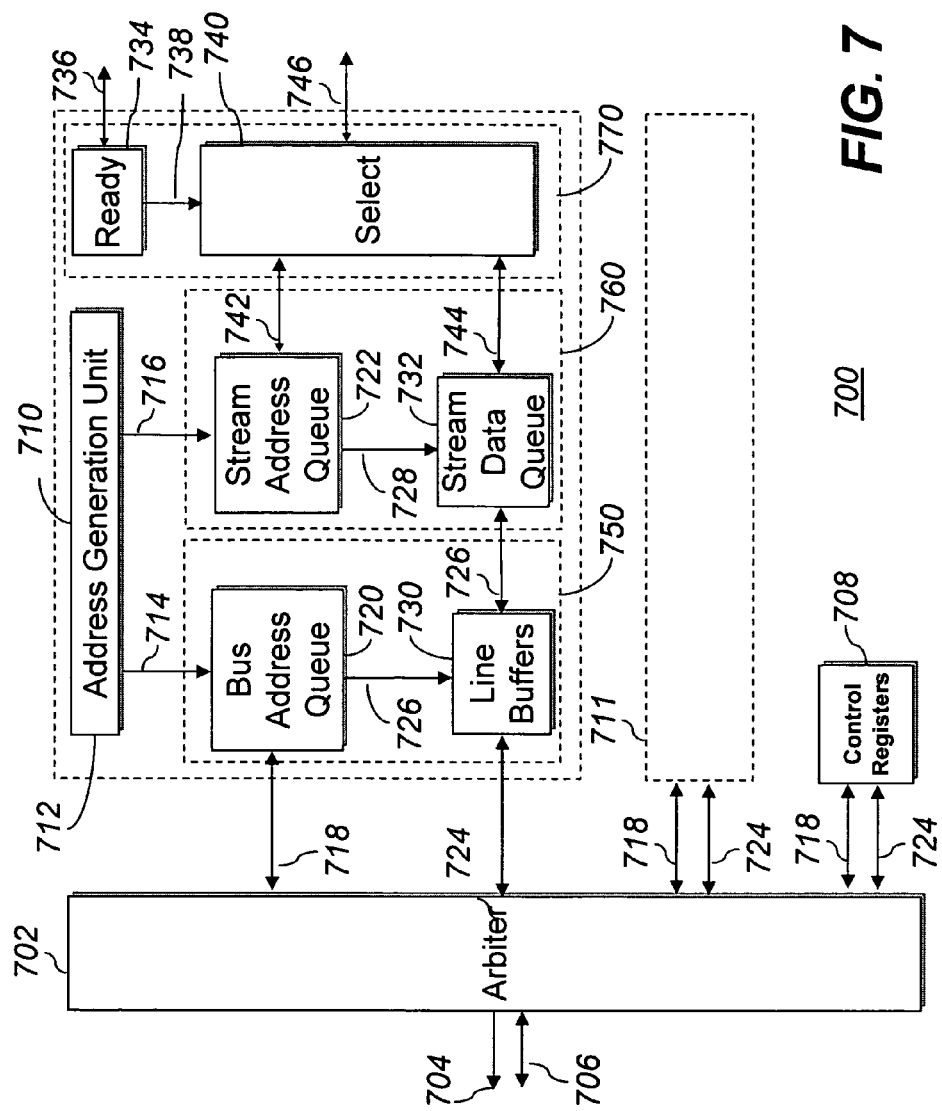
FIG. 7 is an electrical block diagram of an exemplary streaming data interface device, in accordance with some embodiment of the present invention.

Referring to FIG. 7, an electrical block diagram of a streaming data interface device 700 is shown, in accordance with some embodiments of the present invention. The streaming data interface device 700 comprises an arbiter 702, at least one stream unit 710, and control registers device 708. The arbiter 702 is coupled to other system components such as another stream unit 711 or a conventional cache memory I/O unit, peripherals (not shown in FIG. 7), and at least one memory device, using an address bus 704 and a bi-directional data bus 706. The arbiter 702 decides which of the stream units 710, 711 has access to the address bus 704 and data bus 706. In an alternative embodiment, the arbiter 702 is not needed when there is only one stream unit 710. The arbiter 702 is coupled to the control registers unit 708 with a bi-directional command bus 718 and data bus 724. The control registers unit 708 holds the stream descriptors and other control parameters of the stream unit 710, 711 and arbiter 702. The arbiter 702 is also coupled to the at least one stream unit 710 with bi-directional command bus 718 and data bus 724. In some embodiments, the arbiter 702 may give more priority to stream unit 710 compared to stream unit 711 if the stream descriptors used by stream unit 710 requires more bandwidth than the stream descriptors used by stream unit 711. For example, if the target data for stream unit 710 requires twice the number of cycles to fetch from memory when compared to the number of cycles to write target data for stream unit 711, the arbiter 702 gives two access to stream unit 710 for each access by stream unit 711

Again referring to FIG. 7, the stream unit 710 uses the stream descriptors stored in control registers unit 708 to transfer data. The stream unit 710 can be configured for one way data transfer either to or from other system components such as a stream processor, with a command bus 736 and data bus 746. In an example embodiment, stream unit 710 is configured for one way data transfer from other system components on data bus 724 to a stream processor on data bus 746, and stream unit 711 is configured for one way data transfer from a stream processor on data bus 746 to other system components on data bus 724. System components refer to stream data interface devices including, but not limited to, stream processors, bus modules, peripherals, and memory elements. In some embodiments, the streaming data interface device transfers target data from one system component to another. In an embodiment wherein both system components are characterized as a memory (i.e. memory device or memory element), the streaming data interface device is used to alter at least one of stream location or shape of the stream data.

Again referring to FIG. 7, the stream unit 710 comprises an address generation unit 712, a bus interface unit 750, a stream storage unit 760, and a stream interface unit 770. The bus interface unit 750 comprises a bus address queue 720 and a line buffer 730. The stream storage unit 760 comprises a stream address queue 722 and a stream data queue 732. The stream interface unit 770 comprises a ready unit 734 and a select unit 740. The address generation unit 712 serves as the primary controller of the stream unit 710. The bus interface unit 750 serves to make bus requests based control signals from the address generation unit 712. The stream storage unit 760 serves to store target data from stream data fetched by the bus interface unit 750. The stream interface unit 770 serves to provide target data stored in stream storage unit 760 to system components. The address generation unit 712 controls the bus interface unit 750 by storing appropriate bus addresses in the bus address queue 720. The bus interface unit 750 then makes transfer requests from the bus addresses stored in bus address queue 720. The address generation unit 712 controls the stream storage unit 760 by storing stream address in the stream address queue 722. The stream storage unit 760 then stores data from the line buffer 730 in the bus interface unit 750. The stream interface unit 770 then transfer data stored by stream storage unit 760 to system components.

Again referring to FIG. 7, the address generation unit 712 generates bus addresses based on stream descriptors. In an example embodiment, the address generation unit 712 contains circuitry such as adders to calculate an address as the sum of SA 505 and stride 510. The bus address queue 720 accepts the generated bus addresses via control signals 714. The bus address queue 720 issues data transfers via command bus 718 in the same order the bus address are generated by the address generation unit 712. A generated bus address on control signals 714 that matches a bus address in the bus address queue 720 will not be stored so as to avoid duplicating bus transfers on command bus 718. The line buffers 730 store data from the data bus 724 when the bus address queue 720 signals the line buffers 730 via control signal 726 that there is a match of the bus address on command bus 718 to an entry in the bus address queue 720.

Again referring to FIG. 7, the address generation unit 712 also generates stream addresses based on stream descriptors. The stream address queue 722 accepts the generated stream address via control signals 716. The stream address queue 722 signals the stream data queue 732 to obtain data from the line buffers 730 when the line buffers 730 contain data elements specified in the stream address stored in the stream address queue 722. In one embodiment, the bus addresses stored in the bus address queue 720 are the upper 29 bits of a 32-bit address, while the stream addresses stored in stream address queue 722 comprise an index to the bus address queue 720, plus the lower 3 bits of the 32-bit address. The index to the bus address queue 720 is used by the stream address queue 722 to determine if the line buffers 730 contain data to be stored in the stream data queue 732. In this embodiment, the lower 3 bits of the 32-bit address are used as an address to access the line buffers 730 and are used by the stream data queue 732 via control signal 728 to store at least one stream data element from the line buffers 730 via data bus 726 into the stream data queue 732, in the same order as the generated stream addresses.

Again referring to FIG. 7, the ready unit 734 receives commands via control signals 736 that data is needed, and informs the select unit 740 via control signal 738 to select the proper number of stream elements in the stream data queue 732. The ready unit 734 activates a signal 736 to indicate that the requested stream data is available. The select unit provides the stream data on data bus 746 in the proper order requested on control signal 736.

In alternative embodiments, the stream unit 710 can receive stream data from data bus 746 for transfer on data bus 724. In those alternate embodiments, the ready unit 734 receives commands via control signals 736 that a number of stream data elements are available. The select unit 740 receives the stream data from data bus 746 and stores the stream data in stream data queue 732. The line buffers 730 then write data on data bus 724 transferred from stream data queue 732.

In some embodiments, the arbiter 702, the control registers device 708, the address generation unit 712, the bus address queue 720, the line buffer 730, the stream address queue 722, the stream data queue 732, the ready unit 734, and the select unit 740 are independent circuits, each of which is constructed as a state machine, or may be constructed using a microcontroller or equivalent thereto.

Figure 8:
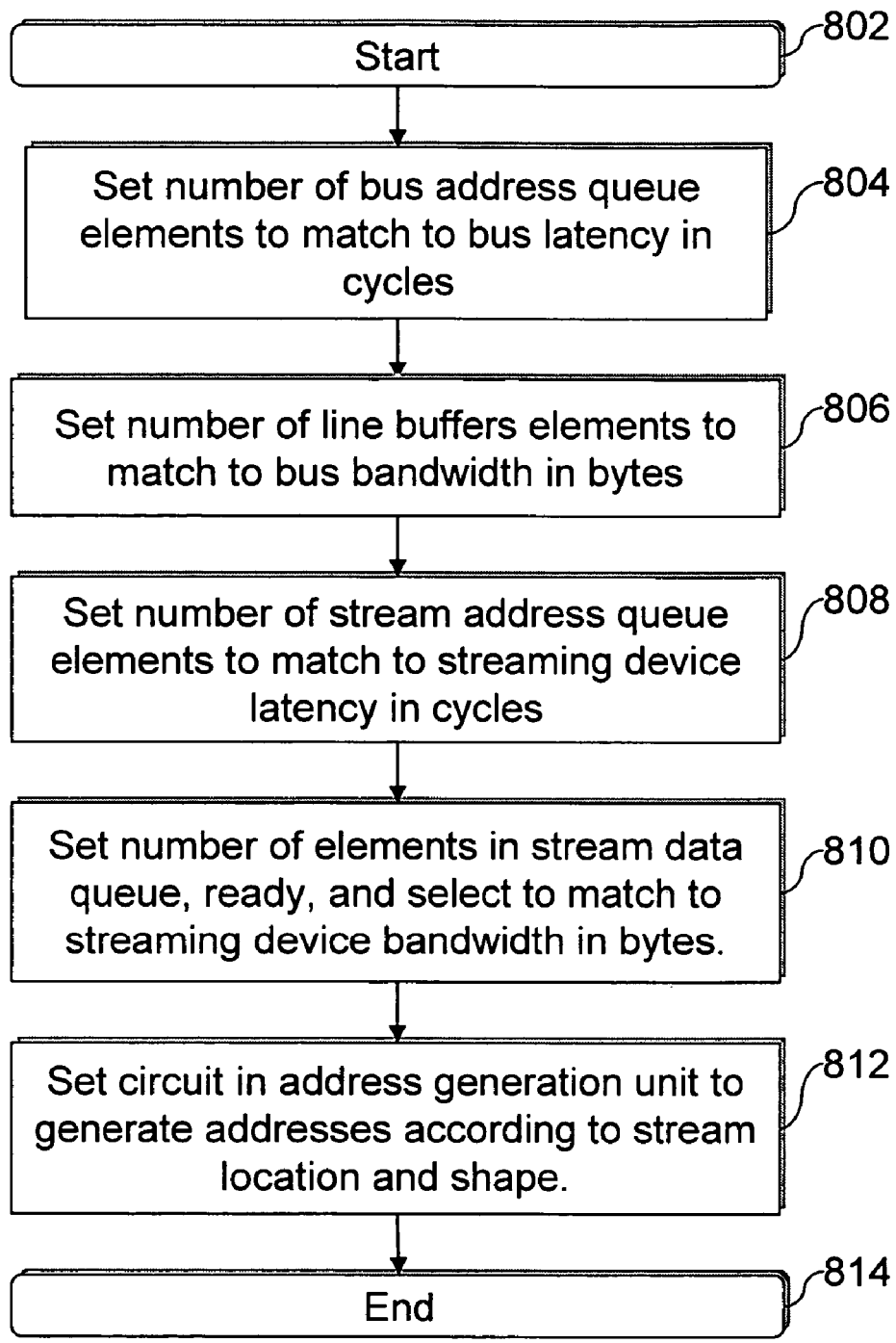
FIG. 8 is a flow chart of a method in accordance with an embodiment of the present invention.

Referring to FIG. 8, a flow chart shows some steps of the method step 612 described above with reference to FIG. 6, which is used to optimize and generate a candidate stream unit of a streaming data interface device, in accordance with some embodiments of the present invention. Reference is made to the parts of the streaming data interface device 700 (FIG. 7), with an understanding that the streaming data interface device now being described has the nature of a candidate streaming data interface device whose parameters (such as the size of a part) are modified by this method until a criteria is met. The method starts at step 802. At step 804, an automation tool 100 sets a number of elements of the bus address queue 720 to match a bus latency of the bidirectional data bus 706, measured by clock cycles. The number of bus address queue elements must be no more than a maximum number of queue elements, which is a circuit constraint (104, FIG. 1), and should be at least the bus latency, which is a system constraint (106, FIG. 1). In an alternative embodiment, bus latency is expressed as the maximum number of pending requests between system component and the streaming data interface device. Next, at step 806, the automation tool 100 sets a number of (byte wide) line buffer elements of the line buffers 730 to match a bus bandwidth of the bidirectional data bus 704, in bytes. The number of line buffer elements must be no more than a maximum number of line buffer elements, which is a circuit constraint (104, FIG. 1), and should be at least the bus bandwidth, which is a system constraint (106, FIG. 1). Bus bandwidth is expressed as the peak number of bytes transferred on the bidirectional data bus 704 or as the average number of bytes transferred on the bidirectional data bus 704.

Again, referring to FIG. 8, at step 808, the automation tool 100 sets a number of elements of the stream address queue 722 to match a latency of a streaming device to be coupled to the streaming data interface device 700 by the command bus 736 and data bus 746, from which or to which the streaming data is to be streamed. The number of stream address queue elements must be no more than a maximum number of stream address queue elements, which is a circuit constraint (104, FIG. 1), and should be at least the latency of the streaming device, which is a system constraint (106, FIG. 1). At step 810, the automation tool 100 sets a number of elements in the stream data queue 732, the ready function 734, and the select function 740 to match a bandwidth of the streaming device. The number of stream data queue elements must be no more than a maximum number of stream data queue elements, which is a circuit constraint (104, FIG. 1), and the bandwidth of the streaming device, which is a system constraint (106, FIG. 1). At step 812, the automation tool 100 sets a circuit in the address generation unit 712 to generate an address according to the storage location of the streaming data in the memory from or to which the streaming data is to be read or written via address bus 704 and bi-directional data bus 706. The address must match the width of the address, which is a system constraint (106, FIG. 1). The process terminates at step 814.

Referring again to FIG. 8 as described above with reference to FIG. 6, it will be appreciated that the steps in the flow chart can be iterated for each set of stream descriptors to generate a candidate stream units 710, 711 of the streaming data interface 700. For example, an input stream has a rectangular shape of 60 by 30 8-bit pixels centered in a 640 by 480 pixel-image at address 153600. The values of the input stream descriptors (SA, stride, span, skip, type) are (153600, 1, 60, 580, 0). An output stream has a linear shape and storage location at address 307200. The values of the output stream descriptors (SA, stride, span, skip, type) are (307200, 1, 1, 1, 0). For this example, bus latency is given as an average of 20 clock cycles to read one stream element from memory. The bus bandwidth is given as the peak bandwidth of 8 bytes per cycle. The streaming device has a bandwidth of 4 bytes per cycle. Based on the stream descriptors and system constraints in this example, two stream units 710, 711 are configured in such a way that one stream unit 710 transfers data from memory to a streaming device and one stream unit 711 transfers data from a streaming device to memory. In step 804, the bus address queue 720 is configured with at least 20 queue elements to match the bus latency of 20 clock cycles. In step 806, line buffer 730 is configured to store 8 bytes to match the peak bandwidth of 8 bytes per cycle. In step 808, the stream address queue 722 is configured with at least 4 queue elements to match the streaming device bandwidth of 4 bytes per cycle. In step 810, the stream data queue is also configured with at least 4 queue elements to match the streaming device bandwidth of 4 bytes per cycle. The ready 734 and select 740 units are configured to support a transfer of at most 4 bytes per cycle. In step 812, the address generation unit 712 for input stream unit 710 is configured to generate a bus address pattern of 153600, 153601, ... 153629, 154240, 154241, and so on. In step 812, the address generation unit 712 for output stream unit 711 is configured to generate a bus address pattern of 307200, 307201, 307202, ... and so on. Referring to FIG. 6 and in step 622, a candidate stream unit 710, 711 is selected and integrated with the arbiter 702 and control register unit 708 to result in a new streaming data interface device.

It will be appreciated that embodiments of the invention described herein may be comprised of one or more conventional processors and unique stored program instructions that control the one or more processors to implement, in conjunction with certain non-processor circuits, some, most, or all of the functions of a compiler or processor system that, among other things, generates executable code and setup parameters that control data transfer in the processing system and determines memory hierarchy configuration described herein. The non-processor circuits may include, but are not limited to signal drivers, clock circuits, power source circuits, and user input devices. As such, these functions may be interpreted as steps of a method to perform, among other things, generation of the executable code and setup parameters. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for automatic design of a streaming data interface circuit of a processing system, the method comprising:
   selecting a set of circuit parameters consistent with a set of circuit constraints;
   obtaining a set of stream descriptors that describe data locations of target data embedded within a data stream, wherein the target data can be transferred by the streaming data interface circuit between the data stream and a streaming device;
   generating a hardware description of a candidate streaming data interface circuit implemented as one of an application specific integrated circuit and a configurable logic, based upon the set of circuit parameters, that can transfer the target data as specified by the set of stream descriptors;
   evaluating the candidate streaming data interface circuit with respect to one or more quality metrics; and
   outputting the hardware description of the candidate streaming data interface circuit in response to the candidate streaming data interface circuit satisfying a set of system constraints and being better in at least one of the one or more quality metrics than other candidate streaming data interface circuits.

2. The method according to claim 1, wherein the obtaining of the set of stream descriptors comprises obtaining one or both of a set of source stream descriptors and destination stream descriptors, and wherein the target data can be transferred, respectively, from a source stream to the streaming circuit or from the streaming circuit to a destination stream, or both.

3. The method in accordance with claim 1, wherein the set of circuit constraints includes a constraint selected from the group consisting of the maximum area, the maximum number of buffer elements, the maximum circuit latency, and the maximum power dissipation for the streaming data interface circuit.

4. The method in accordance with claim 1, wherein the set of system constraints includes a constraint selected from the group consisting of bus width, bus latency, bus bandwidth, streaming circuit latency, and streaming circuit bandwidth.

5. A method in accordance with claim 1, wherein the steps of selecting a set of circuit parameters, obtaining a set of stream descriptors, generating a hardware description of a candidate streaming data interface circuit, and evaluating the candidate streaming data interface circuit are repeated to generate a set of hardware descriptions of pareto-optimal streaming data interface circuits that satisfy the set of system constraints and are better in at least one of the one or more quality metrics than other candidate streaming data interface circuits.

6. A method in accordance with claim 1, wherein a quality metric of the one or more quality metrics is a metric selected from the group consisting of the area of the candidate streaming data interface circuit, the latency of the candidate streaming data interface circuit, the throughput of the candidate streaming data interface circuit and the clock speed of the candidate streaming data interface circuit.

7. The method according to claim 1, wherein the set of stream descriptors includes a starting address and at least two of a STRIDE value, a SPAN value, a SKIP value, and a TYPE value.

8. The method in accordance with claim 1, wherein the hardware description of the candidate streaming processor circuit is a register transfer language hardware description.

9. The method in accordance with claim 1, wherein the stream data interface circuit is coupled in a system to at least one system component.

10. A streaming data interface circuit, comprising:
    a control registers unit to store stream descriptors and control parameters for at least one stream unit:
    at least one stream unit operable to generate addresses based on the stream descriptors and transfer target data between at least two system components as contiguous usable data using a data bus, wherein each of the at least one stream data units comprises a bus address queue to store the generated bus addresses for the target data;
    an arbiter unit operable to select the at least one stream unit for access to the data bus, wherein the selection is based on the control parameters, wherein the control registers unit, the at least one stream unit, and the arbiter unit are implemented as one of an application specific integrated circuit and a configurable logic.

11. The streaming data interface circuit according to claim 10, wherein each of the at least one stream unit comprises:
an address generation unit to generate bus addresses for the target data and stream addresses for a system component based on stream descriptors;
a line buffer unit to store the target data transferred on the data bus;
a stream address queue to store the stream addresses for streaming data that is transferred between the stream unit and the system component;
a stream data queue to store the streaming data;
a ready unit to receive commands for transfer of the streaming data; and
a select unit to transfer the proper amount of streaming data from the stream data queue according to the commands.

12. The streaming data interface circuit according to claim 10, wherein the set of stream descriptors includes a starting address and at least two of a STRIDE value, a SPAN value, a SKIP value, and a TYPE value.

13. The streaming data interface circuit in accordance with claim 10, wherein a direction of data transfer of the stream unit is configurable.

14. The streaming data interface circuit in accordance with claim 11, wherein a circuit in the address generation unit used to calculate bus addresses for the target data is configurable.

15. The streaming data interface circuit in accordance with claim 11, wherein a circuit in the address generation unit used to calculate stream addresses for a system component is configurable.

16. The streaming data interface circuit in accordance with claim 11, wherein a number of buffer elements of the stream address queue is configurable.

17. The streaming data interface circuit in accordance with claim 11, wherein a size of the stream address queue and a size of the stream data queue are configurable.

18. The streaming data interface circuit in accordance with claim 11, wherein a number of buffer elements of the line buffers unit is configurable.

19. The streaming data interface circuit in accordance with claim 11, wherein a width of ready unit and select unit to set the number of stream elements transferred per cycle is configurable.

20. A computer readable medium for storing a set of program instructions, which when executed on a computer, designs a streaming data interface circuit of a system, the program instructions comprising:
a set of instructions for inputting a set of circuit constraints;
a set of instructions for inputting a set of system constraints;
a set of instructions for inputting a set of stream descriptors that identify locations of target data;
a set of instructions for selecting a set of circuit parameters consistent with the set of circuit constraints;
a set of instructions for generating a hardware description of a candidate streaming data interface circuit implemented as one of an application specific integrated circuit and a configurable logic and optimized based upon the set of circuit parameters to transfer target data specified by the stream descriptors;
a set of instructions for evaluating the candidate streaming data interface circuit with reference to one or more quality metrics; and
a set of instructions for outputting the hardware description of the candidate streaming data interface circuit when the candidate streaming data interface circuit satisfies the set of system constraints and is better in at least one of the one or more quality metrics than other candidate streaming data interface circuits.

* * * * *